United States Patent [19]
Maeda et al.

[11] 3,975,730
[45] Aug. 17, 1976

[54] RADAR DATA SELECTION EQUIPMENT

[75] Inventors: Takamasa Maeda; Yasuhiko Kamata; Shyozo Shimaya; Taiji Tatsuta; Takamasa Yamashita; Hiromi Kawakami; Takeshi Matsuki; Yoshiaki Yato, all of Tokyo; Michinori Yokouchi; Takeshi Kijima, both of Amagasaki, all of Japan

[73] Assignees: Nippon Telegraph and Telephone Public Corporation; Mitsubishi Denki Kabushiki Kaisha, both of Tokyo, Japan

[22] Filed: Dec. 5, 1974

[21] Appl. No.: 529,954

[30] Foreign Application Priority Data
Dec. 19, 1973 Japan............................ 48-141363
Dec. 19, 1973 Japan............................ 48-141364

[52] U.S. Cl............................. 343/6 R; 343/5 DP; 343/7 A
[51] Int. Cl.²...................................... G01S 9/02
[58] Field of Search.................. 343/5 DP, 6 R, 7 A

[56] References Cited
UNITED STATES PATENTS

| 3,680,095 | 7/1972 | Evans................................. 343/7 A |
| 3,836,964 | 9/1974 | Evans.............................. 343/5 DP X |
| 3,838,422 | 9/1974 | MacArthur et al................. 343/7 A |
| 3,900,846 | 8/1975 | Gibbon et al....................... 343/6 R |

*Primary Examiner*—T.H. Tubbesing
*Attorney, Agent, or Firm*—Oblon, Fisher, Spivak, McClelland & Maier

[57] ABSTRACT

A radar data selection equipment comprising: a quantizer for quantizing analog data supplied from a radar, a target data detector for detecting target data according to the signal quantized by the quantizer, a gate disposed between the target data detector and a follow-up computer capable of inhibiting the output of specific signals among the data from the radar, and a data quantity monitor for detecting the quantity of signals supplied from the target data detector and transmitting to the gate a control command to cause the gate to inhibit the output of the specific signals when the quantity of the signals detected exceeds a predetermined set value.

7 Claims, 4 Drawing Figures

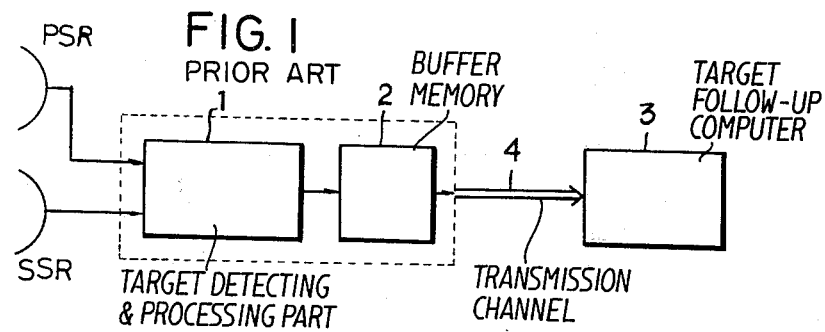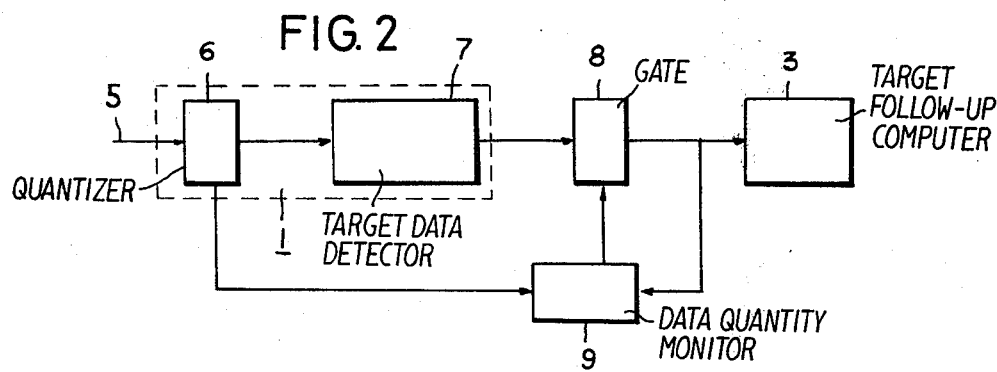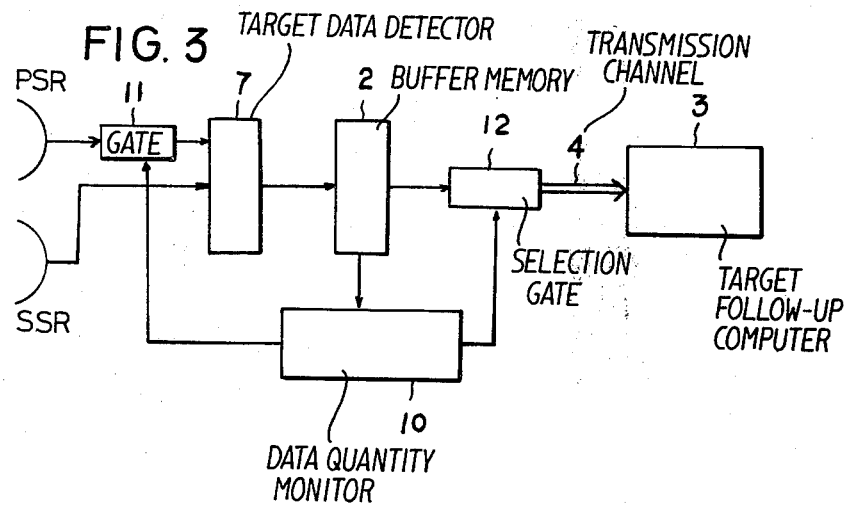

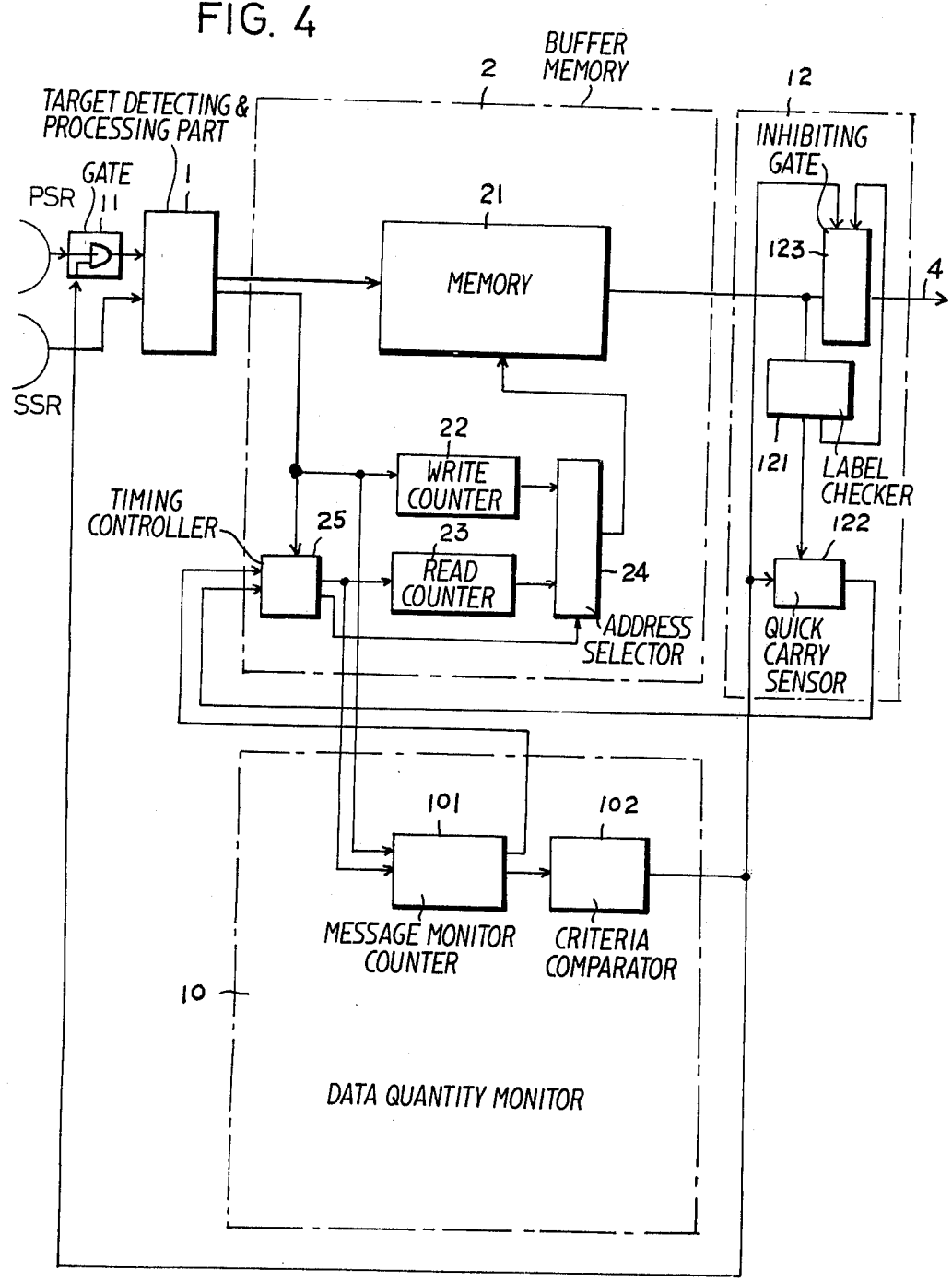

RADAR DATA SELECTION EQUIPMENT

BACKGROUND OF THE INVENTION

1. Field of the Invention

The present invention relates to a radar data selection equipment, and, more particularly, to an improved radar data selection equipment suited for use in an aviation control system.

2. Description of the Prior Art

Most of the aviation control systems in use in Japan are operated through wireless communications. Even in an aviation control system using radar, an air traffic controller judges aviation conditions to maintain safety by confirming the position of an airplane according to (1) a strip obtained through flight data processing (FDP) based on flight schedule data supplied from the pilot of the airplane before its takeoff and according to (2) a plane positional data detected by the radar. Such a human-controlled system has become obsolete with the recent rapid increase in the volume of air traffic. Unfortunately, a number of accidents have occured due to the failure of conventional aviation control.

Under the circumstances, research and development of an air-route automatic control system are in progress to permit automatic aviation control by (1) monitoring air traffic over the entire domestic area through a plurality of radar systems and by (2) processing the monitored data by an electric computer system. The heart of such an aviation control system is the radar data processing system (RDP) which is provided with a radar target detector as it is sometimes called, or digitizer.

FIG. 1 is a block diagram showing an example of the digitizer which consists essentially of a target detecting and processing part 1, and a buffer memory 2. The target detecting and processing part 1 comprises a signal detecting part and a correlation computing part. The signal detecting part is one in which analog data from the primary radar and the secondary radar are quantized into digital signals. The correlation computing part computes the correlation between the primary and secondary radar data by a statistical processing method, such as the sliding window method, to obtain positional data of a target, i.e., an airplane, expressed in terms of distance and direction angle or data such as identification code and flight altitude. The buffer memory 2 stores digital data supplied from the target detecting and processing part 1. The output of the digitizer is transmitted to a target follow-up computer 3 through a transmission channel 4. A suitable display device such as a cathode-ray tube is used to display the target data in a digital form together with the description indicated by the side thereof. This display enables the control officer to view data on an airplane within a range of about 300 km in radius, with respect to position, flight direction, identification, aircraft number and other data.

The primary radar PSR refers to an ordinary radar capable of receiving a signal reflected from a target, i.e., an airplane. The secondary radar SSR is one which sends an interrogation signal to a flying airplane by way of an antenna rotated coaxially with the antenna of the primary radar, thereby interrogating the airplane identification (such as the name and number of the airplane) or flight altitude. The airplane, when equipped with a transponder, makes an automatic response, in terms of an electric waveform, to the interrogation.

Generally, the signal received by the primary radar contains strong, unnecessary waves, called clutter signal, reflected from clouds, mountains, and other objects. The clutter signal causes the buffer memory of the digitizer to overflow leaving no capacity to accept useful data. In such an event, a target cannot be identified as true data. One approach to this problem is to provide the buffer memory with a sufficient capacity. With this improvement, however, the quantity of data supplied to the follow-up computer must be within the capacity of the computer. To this end, it is necessary to secure the target data by causing the useless clutter data to overflow when the memory becomes full.

The target data detected by the digitizer of the radar data processing system contains (1) data on a clutter signal and an airplane which have been received by the primary radar, and (2) data on an airplane, which has been received by the secondary radar. The clutter signal comprises unnecessary data produced due to radar reflection from clouds, waves on the sea, mountains and other causes. This clutter data accounts for a considerable part of the detected data from the primary radar. Most of the detected data from the secondary radar is useful and equivalent to the data detected by the primary radar. Therefore, in order to effectively prevent the useful data from being wasted due to memory overflow, the primary radar data which contains a considerable amount of useless data must selectively be discarded.

SUMMARY OF THE INVENTION

An object of the invention is to provide improved radar data selection equipment.

Another object of the invention is to provide radar data selection equipment using a gate means inserted between a target data detector and a follow-up computer, the gate means having the function of inhibiting the output of a specific signal among the data supplied from the radar when the quantity of the signal supplied from the target data detector exceeds a predetermined set value.

Another object of the invention is to provide radar data selection equipment using a gate means inserted between a target data detector and a follow-up computer, the gate means having the function of inhibiting the output of signals in the order of high-to-low signal level according to the signal level data supplied from a quantizer when the quantity of the signal supplied from the target data detector exceeds a predetermined set value.

Still another object of the invention is to provide radar data selection equipment comprising a primary radar and a secondary radar wherein, when the quantity of the signal supplied from a target data detector exceeds a predetermined set value, the data of either the primary radar or the secondary radar is inhibited by a gate means inserted between the target data detector and a follow-up computer. According to the invention, the data of the primary radar is essentially inhibited.

Still another object of the invention is to provide a radar data selection equipment comprising a primary radar and a secondary radar wherein, when the quantity of the signal supplied from a target data detector exceeds a predetermined set value, the output of either the primary radar or the secondary radar is inhibited by a gate means in the output stage of either the primary or secondary radar. According to the invention, the data of the primary radar is essentially inhibited.

A further object of the invention is to provide radar data selection equipment comprising a buffed memory capable of storing the output of a target data detector wherein, when the quantity of the data stored in the buffer memory exceeds a predetermined set value, a gate means inserted between the buffer memory and a follow-up computer is operated to inhibit the data of either the primary radar or the secondary radar.

The foregoing and other objects are attained in accordance with one aspect of the present invention through the provision of a radar data selection equipment comprising: a quantizer for quantizing analog data supplied from a radar, a target data detector for detecting target data according to the signal quantized by the quantizer, a gate disposed between the target data detector and a follow-up computer capable of inhibiting the output of specific signals among the data from the radar, and a data quantity monitor for detecting the quantity of signals supplied from the target data detector and transmitting to the gate a control command to cause the gate to inhibit the output of the specific signals when the quantity of the signals detected exceeds a predetermined set value.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a block diagram showing a digitizer,

FIG. 2 is a block diagram showing an embodiment of the invention,

FIG. 3 is a block diagram showing another embodiment of the invention, and

FIG. 4 is a block diagram showing an example obtained according to the embodiment shown in FIG. 3.

DETAILED DESCRIPTION OF THE PREFERRED EMBODIMENTS

Referring now to the drawings, wherein like reference numerals designate identical or corresponding parts throughout the several views, and more particularly to FIG. 2 thereof, there is shown in block form one embodiment of the invention wherein the reference numeral 5 denotes an input terminal to which an analog signal is applied from a primary radar PSR and 6 denotes a quantizer for quantizing the analog signal. The quantizer 6 slices the analog signal, samples it at regular time intervals, and converts it into a digital signal. The numeral 7 denotes a target data detector for detecting an airplane target according to the so-called sliding window method or the like. The target data detector 7 corresponds to the part other than the quantizer in a digitizer. The numeral 8 represents a gate operated to inhibit the output of a specific signal according to an instruction from a data quantity monitor 9. The data quantity monitor 9 monitors the data quantity at the output of the gate 8, and, when the data quantity exceeds a given value, the monitor 9 sends an instruction to the gate 8 according to the signal level data supplied from the quantizer 6.

Assume that a clutter occurs within the range of the radar. Then a large amount of a high level clutter signal, i.e., a signal reflected from an object other than the target airplane, becomes included in the analog radar video signal applied to the input terminal 5. As a result, the quantity of data appearing at the output of the gate 8 increases. This increase in the quantity of data is detected by the data quantity monitor 9. At the same time, the quantizer 6 sends the data quantity monitor 9 the data as to the position in the area of radar coverage where the clutter signal has originated and as to the level at which the clutter signal has been generated. According to this data, the data quantity monitor 9 delivers to the gate 8 data of the signal level at which the output is inhibited.

Generally the clutter signal is large in signal intensity and near the signal saturation level. This feature is utilized so that the signal output is inhibited in the order of high-to-low signal level until the quantity of the output data from the gate 8 meets a given limit of the processing capacity of the follow-up computer 3.

In this operation, it is desirable that the quantity of the data from the gate 8 meet a given processing capacity of the follow-up computer 3 for each radar scan because the quantity of data processed by an ordinary follow-up computer is a series of processing sequences for each radar scan.

The buffer memory, though not shown in FIG. 2, may be installed either before or after the gate 8. It is to be understood that the foregoing principle of the invention holds irrespective of the use of the secondary radar.

FIG. 3 illustrates in block form another embodiment of the invention. Like components are indicated by identical references in FIGS. 2 and 3. In FIG. 3, the numeral 10 denotes a data quantity monitor comprising a counter. This counter counts the number of digital data supplied to the buffer memory 2 within the period of one radar scan of the primary and secondary radars. (Note: The antennas of these radars are rotated coaxially with each other.) The data quantity monitor 10 sends a gate command to a gate 11 when the count exceeds a given value to cause the gate 11 to inhibit the primary radar data which has been digitized by a target detecting and processing part 1 from being applied to the buffer memory 2. The gate command is applied also to a selection gate 12 so that only the data from the primary radar is selectively discarded from among the radar stored in the buffer memory 2 thereby preventing the primary radar data from being supplied to the follow-up computer 3 while at the same time making the memory available for the secondary radar data.

The primary or secondary radar data selection at the selection gate 12 can easily be made through a message label composed, for example, of 4 bits in a format which is added to each radar data when it is stored in the buffer memory 2.

Thus, only the primary radar data is selectively discarded. As a result, the secondary radar data which is quite useful even if clutter occurs can be retained and a substantially constant amount of radar data can be supplied to the follow-up computer.

FIG. 4 shows in block form a specific example or radar data selection equipment realized according to the embodiment shown in FIG. 3. Referring to FIG. 4, the numeral 21 denotes a memory for storing the data detected by the target detecting and processing part 1. This memory may be, for example, an ordinary core memory. The numeral 22 stands for a write counter whose count advances by one each time data is written into the memory 21. The numeral 23 represents a read counter whose count advances by one each time data is read from the memory 21. The numeral 24 is an address selector which is switched by a timing controller 25 and sends the memory 21 the value of either the write counter 22 or the read counter 23 as an address data. The timing controller 25 controls the switching of the address selector 24. The numeral 101 is a message monitor counter whose count value increases by 1 each time data is written into the memory 21 or decreases by 1 each time data is read from the memory 21. The numeral 102 denotes a criteria comparator which detects that the content of the message counter 101 is above a given value such as, for example, 224 when the capacity of the memory 21 is 256 messages. The criteria comparator 102 opens or closes the gate 11 and contributes to the opening or closing of the selection gate 12. The numeral 121 represents a label checker which detects the primary radar message. The numeral 122 denotes a quick-carry sensor. When the label checker 121 detects the message label of the primary radar in the event that the criteria comparator 102 detects that the count of the message monitor counter 101 exceeds a given value, the quick-carry sensor 122 operates to increase the content of the read counter 23 by 1 and decreases the content of the message monitor counter 101 by 1 thereby ejecting one primary radar message to make the memory 21 available by a capacity of one message. The numeral 123 is an inhibiting gate operated so that the message to be ejected does not emerge as an output.

The line leading from the monitor counter 101 to the timing controller 25 is used to inhibit reading data from the memory 21 when the value of the monitor counter 101 is 0.

There are shown two output lines from the target detecting and processing part 1. The upper line is for the data (such as distance, direction angle and codes) detected by the primary or secondary radar. The lower line is for the pulse indicating that data has been detected.

The radar data selection system of the invention as shown in FIG. 4 can be realized by the use of conventional logical circuits.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A radar data selection equipment comprising:
   a quantizer for quantizing analog data supplied from a primary radar which receives waves reflected from a target and from a secondary radar which receives data supplied from the target;
   a target data detector for detecting the target data according to the signal quantized by the quantizer;
   a gate disposed between the target data detector and a follow-up computer capable of inhibiting data supplied from the primary radar; and
   a data quantity monitor for detecting the quantity of signals supplied from the target data detector and transmitting to the gate a control command to cause the gate to inhibit the data from the primary radar when the quantity of the signals detected exceeds a predetermined set value.

2. A radar data selection equipment comprising: a quantizer for quantizing analog data supplied from a primary radar which receives waves reflected from a target and from a secondary radar which receives data supplied from the target;
   a target data detector for detecting the target data according to the signal quantized by the quantizer;
   a gate disposed between the target data detector and a follow-up computer capable of inhibiting data supplied from the secondary radar; and
   a data quantity monitor for detecting the quantity of signals supplied from the target data detector and transmitting to the gate a control command to cause the gate to inhibit the data from the secondary radar when the quantity of the signals detected exceeds a predetermined set value.

3. A radar data selection equipment comprising:
   a quantizer for quantizing analog data supplied from a primary radar which receives waves reflected from a target and from a secondary radar which receives data supplied from the target;
   a target data detector for detecting the target data according to the signal quantized by the quantizer;
   a first gate disposed between the target data detector and a follow-up computer capable of inhibiting data supplied from the primary radar;
   a second gate in the output stage of the primary radar; and
   a data quantity monitor for detecting the quantity of signals supplied from the target data detector and transmitting to the first and second gates a control command to cause the first gate to inhibit the data from the primary radar and the second gate to inhibit the data from the primary radar when the quantity of the signals detected exceeds a predetermined set value.

4. A radar data selection equipment comprising:
   a quantizer for quantizing analog data supplied from a primary radar which receives waves reflected from a target and from a secondary radar which receives data supplied from the target;
   a target data detector for detecting the target data according to the signal quantized by the quantizer;
   a first gate disposed between the target data detector and a follow-up computer capable of inhibiting data supplied from the secondary radar;
   a second gate in the output stage of the secondary radar; and
   a data quantity monitor for detecting the quantity of signals supplied from the target data detector and transmitting to the first and second gates a control command to cause the first gate to inhibit the data from the secondary radar and the second gate to inhibit the data from the secondary radar when the quantity of the signals detected exceeds a predetermined set value.

5. A radar data selection equipment comprising:
   a quantizer for quantizing analog data supplied from a primary radar which receives waves reflected from a target and from a secondary radar which receives data supplied from the target;
   a target data detector for detecting the target data according to the signal quantized by the quantizer;
   a buffer memory for storing the output of the target data detector;
   a gate disposed between the buffer memory and a follow-up computer capable of inhibiting data supplied from the primary radar; and
   a data quantity monitor for detecting the quantity of data stored in the buffer memory and transmitting to the gate a control command to cause the gate to inhibit the data from the primary radar when the quantity of the data detected exceeds a predetermined set value.

6. A radar data selection equipment comprising:
a quantizer for quantizing analog data supplied from a primary radar which receives waves reflected from a target and from a secondary radar which receives data supplied from the target;
a target data detector for detecting the target data according to the signal quantized by the quantizer;
a buffer memory for storing the output of the target data detector;
a gate disposed between the buffer memory and a follow-up computer capable of inhibiting data supplied from the secondary radar; and
a data quantity monitor for detecting the quantity of data stored in the buffer memory and transmitting to the gate a control command to cause the gate to inhibit the data from the secondary radar when the quantity of the data detected exceeds a predetermined set value.

7. A radar data selection equipment comprising:
a quantizer for quantizing analog data supplied from a primary radar which receives waves reflected from a target and from a secondary radar which receives data supplied from the target;
a target data detector for detecting the target data according to the signal quantized by the quantizer;
a buffer memory for storing the output of the target data detector;
a first gate disposed between the buffer memory and a follow-up computer capable of inhibiting data from the primary radar;
a second gate in the output stage of the primary radar; and
a data quantity monitor for detecting the quantity of data stored in the buffer memory and transmitting to the first and second gates a control command to cause the first gate to inhibit the data from the primary radar and the second gate to inhibit data from being supplied to the buffer memory from the primary radar when the quantity of the data detected exceeds a predetermined set value.

* * * * *